3,441,536
SYNTHETIC RESIN COMPOSITIONS CONTAINING ALPHA - PHENYLTHIOANTHRAQUINONES AS COLORANTS
Chi K. Dien, Buffalo, N.Y., assignor to Allied Chemical Corporation, New York, N.Y., a corporation of New York
No Drawing. Continuation of application Ser. No. 396,376, Sept. 14, 1964. This application Jan. 26, 1968, Ser. No. 701,011
Int. Cl. C08f *47/04, 29/46, 33/02*
U.S. Cl. 260—41                                    10 Claims

ABSTRACT OF THE DISCLOSURE

Pigmented synthetic resin compositions containing alpha-phenylthioanthraquinones as pigments or colorants, said resin compositions resistant to shade alteration upon exposure to elevated temperatures and long exposure to light.

---

This is a continuation of application Ser. No. 396,376, filed Sept. 14, 1964, now abandoned.

This invention relates to the pigmenting or coloring of synthetic resins. It relates more particularly to the coloring of synthetic resins which involve a heating step during the processing thereof, and especially synthetic resins which in the normal form (that is, in the uncolored form as usually obtained in commerce or in commercial manufacture) are clear, substantially water-white, glass-like solids.

The class of synthetic resins comprises a large and commercially valuable class of synthetic materials. It includes such thermoplastic polymeric materials as polystyrene, polymethylmethacrylate, polyvinyl chloride and vinylidene chloride polymers and copolymers, polyethylene, polypropylene, fluorohydrocarbon polymers, cellulosic esters and ethers, and copolymers containing at least one of said materials; as well as such thermosetting resins as silicone, urea formaldehyde, melamine formaldehyde, melamine urea, and phenol formaldehyde resins. Plastic substances of this class possess the characteristic property of flowing at least under the initial application of heat and pressure; consequently they have been employed extensively in various molding processes to form a myriad of useful articles. Many of these have been colored in order to increase their utility and attractiveness.

The range of colorants suitable for coloring such resins is very limited, however, particularly in connection with the production of clear, glass-like colored products. Because of the trend to the use of higher processing temperatures and pressures, organic colorants formerly suitable, i.e., capable of withstanding the processing conditions without alteration of shade or loss of fastness or other desirable properties, have proven to be unsatisfactory to meet the current demands.

In general, the conditions currently employed even in processing thermoplastic resins are too drastic for most organic pigments; and hence inorganic substances, such as carbon black, iron oxides, cadmium selenides, etc., have been utilized to impart color to thermoplastic resins. However, inorganic pigments give colorations lacking in the brightness and/or the clarity which are desirable in many synthetic resin applications.

Furthermore, due to reactions between the organic pigments and the catalysts, antioxidants, preservatives, fungicides, vulcanizates, and other special additives employed in processing the resins, which reactions become increasingly important as the processing conditions are made more severe, the number of organic pigments capable of use in coloring said resins has grown even smaller.

An object of the present invention, therefore, is to provide colored synthetic resin compositions which do not undergo shade alteration upon exposure to high temperatures, for example, up to about 700° F.

Another object of the invention is to provide synthetic resins which are colored yellow shades that do not undergo shade alteration during forming operation at such high temperatures and which are fast to light.

A specific object of the invention is to provide synthetic thermoplastic resin compositions, and especially polystyrene and polymethylmethacrylate resin compositions, which are colored yellow shades that are characterized by heat stability, light fastness, brightness and clarity.

An additional object of the invention is to provide improved processes for the coloring of synthetic resin compositions.

Other objects of the invention in part will be obvious and in part will appear hereinafter.

According to the present invention, the above objects are accomplished by incorporating in synthetic resins, as pigments or colorants, alpha-phenylthioanthraquinones; that is, anthraquinones in which at least one phenylthio radical is substituted in an alpha position of the anthraquinone nucleus.

I have discovered that the alpha-phenylthioanthraquinones are unexpectedly superior colorants or pigments for synthetic resins and in particular those of the type referred to above, more particularly thermoplastic resins which are obtained by polymerization of an unsaturated organic monomer, and especially those which in the normal form are clear, substantially water-white, glass-like solids; they are surprisingly stable in admixture with said resins and particularly the thermoplastic resins, as well as with monomers from which the polymers are produced, during the processing thereof. They do not change color when they are mixed with the resins, or with the monomers from which they are obtainable, and the mixtures are processed under the usual elevated temperature and pressure conditions. Moreover, they do not exhibit any anti-catalytic effect when used with monomeric substances (e.g., methylmethacrylate) and are not themselves adversely affected by the catalysts used in the polymerization of the monomers. Synthetic resin compositions containing said alpha-phenylthioanthraquinones are colored pleasing and desirable bright shades which have excellent fastness and durability characteristics (including retention of gloss on weathering); and the color is surprisingly stable to processing or forming operations at high temperatures (e.g., up to 700° F.), such as molding, spinning, extrusion, and the like, and in the presence of additives (such as peroxides).

The alpha-phenylthioanthraquinones employed in accordance with the present invention correspond to the structural formula

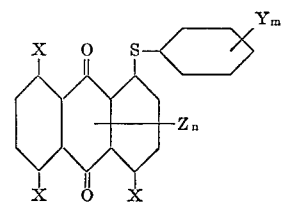

I wherein the X's represent members selected from the group consisting of hydrogen, alkylamino radicals, anthraquinonylamino radicals, and phenylthio radicals having the formula:

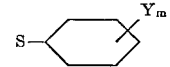

II

Y represents a member selected from the group consisting of hydrogen, halogen, alkyl and alkoxy, Z represents a member selected from the group consisting of hydrogen, halogen, alkyl and alkoxy, in a beta-position of the anthraquinone molecule, $m$ represents one of the numbers 0 to 3, and $n$ represents one of the numbers 0 to 4.

Thus, they include, besides such unsubstituted alpha-phenylthioanthraquinones as 1-phenylthio-anthraquinone; 1,4-bis(phenylthio)anthraquinone; 1,5-bis(phenylthio)anthraquinone; 1,8-bis(phenylthio)anthraquinone and 1,4,5,8-tetrakis(phenylthio)anthraquinone, substituted alpha-phenylthioanthraquinones in which (a) one or more of the phenylthio radicals are themselves substituted by 1 to 3 substituents selected from the group consisting of halogen, alkyl and alkoxy and/or (b) the anthraquinone nucleus is further alpha-substituted by 1 to 3 substituents selected from the group consisting of substituted phenylthio radicals of the above class (a), alkylamino radicals and anthraquinonylamino radicals and/or (c) in which the anthraquinone nucleus is beta-substituted by 1 to 4 substituents selected from the group consisting of halogen, alkyl and alkoxy; and especially in which the halogen substituents are fluorine, chlorine or bromine, and the alkyl and alkoxy substituents contain 1 to 12 carbon atoms.

Those in which at least two of the X's and Y and Z represent hydrogen, and particularly those in which a phenylthio radical is present in each of the benzene nuclei of the anthraquinone molecule (1,5- and 1,8- bis derivatives) are preferred in view of their superior lightfastness. Of these, 1,8-bis(phenylthio)anthraquinone, having the structural formula:

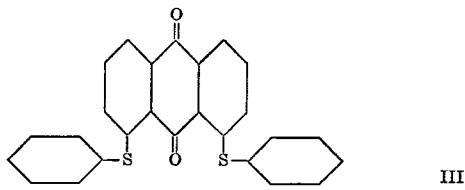

III is especially preferred, inasmuch as it has the advantageous properties not only of imparting to the thermoplastic resins bright yellow colorations having excellent stability to heat and excellent fastness to light, but in addition possesses a surprisingly greater tinctorial power. Thus, while equal weights of 1,8-bis(phenylthio)anthraquinone and of 1,5-bis(phenylthio)anthraquinone will produce similar reddish yellow shades of similar stability to heat, the strength of the coloration produced by the 1,8-isomer is about twice that obtained with the 1,5-isomer.

An additional advantageous property of said preferred alpha-phenylthioanthraquinones is their solubility in said resins, as well as in certain of the common organic solvents (for example, acetone, toluene and ethyl acetate). As a result of the use of such colorants in accordance with the present invention, resins which in the normal form are clear, glass-like solids, and especially polystyrene and polymethyl-methacrylate, form clear, bright, yellow to reddish-yellow glass-like products which do not change color during processing at high temperatures and on exposure to sunlight, and which retain their gloss and clarity on weathering.

The incorporation of the alpha-phenylthioanthraquinones with the resins or with monomers or co-monomers thereof, can be accomplished by known methods. For example, pellets or beads or rods (the usually available commercial forms) of the resin polymer can be surface coated by mixing them with the comminuted pigment in a suitable mixer and feeding the thus coated polymer to a suitable forming apparatus, e.g., a molding press, extruder or fiber spinner. Alternatively an aqueous paste or solvent solution of the alpha-phenylthioanthraquinone can be admixed with the polymer in comminuted form and, after drying (to remove water or solvent), the dried mixture (with additional mixing if desired, for example, in a ribbon mixer) can be fed to a molding press, etc. Or the alpha-phenylthioanthraquinone can be dissolved or suspended in the monomer or co-monomer and the resulting mixture polymerized and formed, in one or separate operations, as is customary.

I am not aware of any polymeric or copolymeric resin compositions, or monomers or co-monomers therefor, in which the novel colorants of the invention could not be incorporated satisfactorily. It is conceivable, however, that there may be some compounds which may prove to be chemically incompatible with one or more of the alpha-phenylthioanthraquinones, which will be readily recognized by those skilled in the art. Similarly, there may be some resin compositions which require molding or processing temperatures higher than may be tolerated by the pigment in the particular chemical environment. For these reasons, the synthetic resins suitable for coloring by the alpha-phenylthioanthraquinones are those which by virtue of their chemical composition and their usual processing temperature do not cause chemical reaction or decomposition of said colorants.

A preferred mode of carrying out my invention involves preparing a mixture of alpha-phenylthioanthraquinone, preferably in essentially pure and finely divided condition, and a synthetic resin in a particulate form (such as, granular polystyrene or polymethacrylate). The mixture is tumbled in known manner, to surface coat the resin with the pigment, and is then fed to a suitable molding, extrusion or spinning apparatus, or combination of such forming devices, operating at a suitable temperature between about 400° and about 600° F. The formed colored plastic products thus obtained are clear, bright yellow to reddish-yellow colored articles which show no evidence of shade alteration.

In accordance with another method of procedure, the alpha-phenylthioanthraquinone is dissolved or suspended in the monomer form of the desired resin (such as, monomethyl-methacrylate) containing a suitable polymerization catalyst (such as, benzoyl peroxide), and the solution is heated to induce polymerization in the usual manner. The resultant yellow colored polymer can be formed in any suitable manner (e.g., extruded, molded, spun, and the like). The formed articles thus obtained have properties substantially identical with those formed by pigmenting the polymer.

The amount of alpha-phenylthioanthraquinone which can be used to color synthetic resin compositions (resins or monomers or co-monomers) can vary over a wide range. The particular amount used is dependent upon the depth of shade or coloration desired and the particular colorant employed. The invention contemplates the addition of colorant in the range from extremely minute amounts to very large amounts which are limited only by the compatability of the alpha-phenylthioanthraquinone and the particular resin being colored, and which may vary to a considerable degree from resin to resin, as will be evident to those skilled in this art. Thus, light tints, for finished pieces, can be obtained with an amount of alpha-phenylthioanthraquinone as low as 0.0001 part per 100 parts by weight of the resin or resin composition. Deep shades, or master batches, etc., are obtainable with amounts up to 5.0 or more, per 100 parts by weight of resin composition. Master batches can be prepared, for instance, by admixture of the alpha-phenylthioanthraquinone with the resin monomer or polymer in amounts of about 0.5 to about 5.0 parts, preferably from about 1.0 to about 3.0 parts, per 100 parts of resin composition. Products of any desired lighter yellow shade then can be obtained by mixing the colored master batch, after the usual processing and comminution, with unpigmented resin and further processing the mixture, e.g., molding, extruding, spinning, etc.

The alpha-phenylthioanthraquinones can be prepared in various ways, several of which are known. Thus, 1-phenyl-thio-anthraquinone, 1,4- and 1,5-bis(phenylthio) anthraquinone, and their alkyl and alkoxy substituted derivatives, can be produced in the manner described in German Patent 116,951; Annales de Chimie [12] 10, page 716; and U.S. Patents 1,062,990; 2,109,464 and 3,018,154. The preparation of 1,8-bis(phenylthio)anthraquinones, which are novel and are disclosed and claimed in copending application of Robert C. Hoare, Ser. No. 396,377, now abandoned, filed of even date herewith, can be carried out in similar fashion.

For example, a suitable anthraquinone compound having a replaceable substituent in the alpha- position into which the phenylthio radical is to be introduced can be condensed with a suitable thiophenol. The condensation can be effected, for example, by heating in an alcoholic reaction medium such as methanol, ethanol, isopropanol, isobutanol, n-butanol, diethylene glycol monoethyl ether ("Carbitol"), ethylene glycol monoethyl ether ("Cellosolve") or mixtures thereof which also contains an acid-binding agent (such as, sodium hydroxide, potassium hydroxide, sodium carbonate, pyridine, N,N-diethylaniline or mixtures thereof), and the resulting alpha-phenylthio-anthraquinone can be recovered, for example by filtering off the alpha-phenylthioanthraquinone which separates out of the reaction medium as it is formed. Thus, the alpha-phenylthioanthraquinones can be prepared by mixing an alpha-chloro (or bromo or nitro) anthraquinone or one containing further alpha and/or beta substituents (such as, an alkylamino anthraquinone or a 4,4'-halo-1,1'-dianthrimide) with a sufficient amount of a lower alcohol to give a uniform slurry; adding a solution of thiophenol (or o-, m- or p-thiocresol or a thioxylenol or a halogenated or alkoxy derivative of thiophenol, thiocresol or thioxylenol) in a lower alcohol which also contains potassium hydroxide (or sodium hydroxide or sodium carbonate or potassium carbonate); heating the mixture to boiling, and boiling and refluxing until the reaction is complete; filtering the resulting slurry; washing the filter-cake alkali-free with warm water, and drying.

Or they can be prepared by removing the sulfo groups from the corresponding alpha-phenylthioanthraquinone sulfonic acid dyestuffs (e.g., by heating with sulfuric acid); or by halogenating alpha-phenylthioanthraquinones (e.g., brominating a solution of a phenylthioanthraquinone in nitrobenzene or other usual solvent).

The alpha-phenylthioanthraquinones are preferably used in a finely divided form, which can be obtained readily in a known manner, as by micropulverizing, sand grinding and the like.

The following examples describe specific embodiments of my invention and illustrate the best method contemplated for carrying it out; but they are not to be interpreted as limiting the invention to all details thereof, since changes may be made without departing from the scope of the invention. Parts and percentages are by weight and temperatures are in degrees Fahrenheit.

EXAMPLE 1

A number of mixtures, each consisting of 100 parts of polystyrene pellets and 0.05 part of 1,8-bis(phenylthio) anthraquinone, were subjected to the following treatment.

Each mixture was placed in a metal container which was closed and then tumbled mechanically for 5 minutes to surface coat the resin with pigment. Thereafter the coated resin was fed to a laboratory extruder operating at variable temperatures ranging from 320° to 600°, as set out in the table, below. The mass was held in the extruder for 5 minutes and then extruded at slow speed in the form of a continuous rod ⅛ inch in diameter. The rods thus obtained were colored a clear, bright, reddish-yellow and showed no evidence of color (shade) alteration. The rods were pelletized and the respective masses of colored pellets were fed to an injection molding apparatus operating at about 400°. The pellets were thus formed into plaques approximately 2" x 3" x ¼", which were exposed for 320 hours in the Fade-O-Meter and compared with unexposed portions. No noticeable alteration in color had occurred.

For purposes of comparison, colored polystyrene rods were prepared in the same manner, but employing 0.05 part of the commercially available resin colorant C.I. Solvent Yellow 40 instead of the 1,8-bis(phenylthio) anthraquinone. The color of the resulting rods was only about half as intense (strong) as that of the rods obtained with the same amount of 1,8-bis(phenylthio)anthraquinone. In addition, the rods showed alteration in color, as set out in the table.

TABLE

| Extrusion temp. (deg.) | Alteration in color [1] | |
|---|---|---|
| | 1,8-bis(phenylthio) anthraquinone | C.I. Solvent Yellow 40 |
| 320 | Nil | Nil. |
| 400 | Nil | Nil. |
| 500 | Nil | Much. |
| 550 | Nil | Very much. |
| 600 | Nil | Do. |

[1] Alteration rated on the following scale: Nil, slight, appreciable, considerable, much, very much.

EXAMPLE 2

The procedure of Example 1 was repeated using, instead of polystyrene, a like amount of polymethylmethacrylate ("Plexiglas"—Color 100 Formula A). The surface coated polymer was extruded at about 350° and molded at about 325°. The pigmented polymer showed no alteration in shade upon extrusion, notwithstanding the relatively high temperature used (350°). The molded plaque showed no noticeable change in color after exposure in the Fade-O-Meter for 320 hours.

EXAMPLE 3

A mixture of 100 parts of monomethylmethacrylate, 0.1 part of benzoylperoxide and 0.1 part of 1,8-bis(phenylthio)anthraquinone was heated on a steam bath until vigorous boiling occurred. The mixture was removed from the steam bath, and after the vigorous reaction subsided, it was placed in a warm (140°) oven for about 16 hours. Thereafter the polymerization reaction was completed by heating the mass for about 1 hour on the steam bath. The pigmented polymer was then extruded into rods as described in above Example 2. The resulting clear, glass-like rods were colored a bright reddish-yellow. The presence of the 1,8-bis(phenylthio)anthraquinone in the monomeric composition did not interfere with the polymerization to any noticeable extent, nor did the presence of the peroxide catalyst cause any alteration in the color of the pigmented polymer.

EXAMPLE 4

A mixture of 100 parts of polystyrene pellets and 0.05 part of 1-phenylthio-anthraquinone was subjected to the procedure described in above Example 1, employing an extrusion temperature of 600° and a molding temperature of about 400°. Clear, bright, yellow-colored polystyrene was obtained, the color of which was a somewhat greener yellow but of lesser intensity (weaker in strength) than that obtained under like conditions in Example 1. No alteration in the color was noticeable, notwithstanding the high temperatures employed.

EXAMPLE 5

By substituting an equal amount of 1,5-bis(phenylthio) anthraquinone for the 1-phenylthio-anthraquinone employed in Example 4, clear, bright, reddish yellow-colored polystyrene was obtained, the color of which was similar in shade to that obtained under like conditions in Example 1, but the color intensity of which was considerably less (considerably weaker in strength). No alteration in the color was noticeable, notwithstanding the high temperatures employed.

EXAMPLE 6

A mixture of 100 parts of polystyrene pellets and 0.05 part of 4-methylamino-1-phenylthio-anthraquinone was subjected to the procedure described in above Example 1, employing an extrusion temperature of 550° and a molding temperature of about 400°. Clear, bright, violet-colored polystyrene was obtained. No alteration in the color was noticeable, nothwithstanding the high temperatures employed.

As noted above, the invention is not limited to the details of the above specific examples and changes can be made without departing from the scope of the invention.

Thus, various temperatures can be employed in practicing the processes of the examples. For instance, temperatures ranging from about 300° to about 600° F. can be used with polystyrene; and temperatures ranging from about 300° to about 400° F. can be used with polymethylmethacrylate. Moreover, in producing colored polymers by polymerization of the monomers, temperatures between about 120° and about 300° F. can be employed with styrene and temperatures between about 100° and about 250° F. can be employed with monomethylmethacrylate.

Instead of the alpha-phenylthioanthraquinones used in the above specific examples, like amounts of the following alpha-phenylthioanthraquinones may be substituted in said examples:

1,4-bis(phenylthio)anthraquinone
1-(o- or m- or p-methyl-phenylthio)anthraquinone
1-(o- or m- or p-chloro-phenylthio)anthraquinone
1-(o- or m- or p-methoxy-phenylthio)anthraquinone
1-(o- or m- or p-ethoxy-phenylthio)anthraquinone
1-(4'-butyl-phenylthio)anthraquinone
1-(4'-nonyl-phenylthio)anthraquinone
1-(4'-dodecyl-phenylthio)anthraquinone
1-(dimethyl-phenylthio)anthraquinone
1-(6'-isopropyl-3'-methyl-phenylthio)anthraquinone
The corresponding 1,4-, 1,5- and 1,8-bis(substituted phenylthio)anthraquinones
The corresponding 1,4,5,8-tetrakis(substituted phenylthio)anthraquinones
4,4'-bis(phenylthio)-1,1'-dianthrimide
Brominated 1,4-bis or 1,5-bis or 1,8-bis(phenylthio) anthraquinones Synthetic resins and monomers and co-monomers other than those employed in the above specific examples can be substituted for those employed in said examples; such as, polyethylene, polypropylene, polybutylene, fluorine containing polymers, polyvinyl chloride, polyvinyl copolymers, polyacrylonitrile, acrylonitrile copolymers, polycondensates (for example, polyamides such as the nylons), silicones, and cellulose esters and ethers.

The colored resin products can be produced in the form of articles of various shapes and sizes, including molded pieces, sheets, films, fibers, filaments, etc.

I claim:

1. A pigmented composition comprising essentially a synthetic resin selected from the group consisting of polystyrene and polymethylmethacrylate and, as a coloring agent, between about 0.0001 and about 5 parts, per 100 parts by weight of said synthetic resin, of an alpha-phenylthioanthraquinone which corresponds to the structural formula

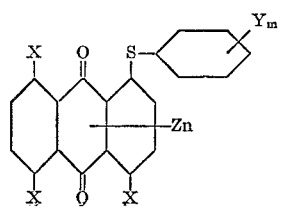

wherein the X's represent members selected from the group consisting of hydrogen, alkylamino radicals, and phenylthio radicals having the formula:

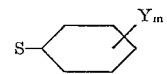

Y represents a member selected from the group consisting of hydrogen, halogen, alkyl and alkoxy,
Z represents a member selected from the group consisting of hydrogen and halogen, in a beta-position of the anthraquinone molecule,
$m$ represents one of the numbers 0 to 3, and
$n$ represents one of the numbers 0 to 4.

2. A pigmented composition as defined in claim 1 wherein the resin is polystyrene.

3. A pigmented composition as defined in claim 1 wherein the resin is polymethylmethacrylate.

4. A pigmented composition comprising essentially a synthetic thermoplastic resin selected from the group consisting of polystyrene and polymethylmethacrylate which in the normal form is a clear, substantially water-white, glass-like solid and, as a coloring agent, between about 0.0001 and 5 parts, per 100 parts by weight of said resin, an alpha-phenylthioanthraquinone as defined in claim 1 in which each of the benzene nuclei of the anthraquinone radical is solely substituted by a phenylthio radical in an alpha position.

5. The pigmented composition as defined in claim 4 wherein the alpha-phenylthioanthraquinone is 1,8-bis-(phenylthio) anthraquinone.

6. The pigmented composition as defined in claim 4 wherein the alpha-phenylthioanthraquinone is 1-phenylthioanthraquinone.

7. A pigmented synthetic resin as defined in claim 5 wherein the resin is polystyrene.

8. A pigmented synthetic resin as defined in claim 5 wherein the resin is polymethylmethacrylate.

9. A pigmented synthetic resin as defined in claim 6 wherein the resin is polystyrene.

10. A pigmented synthetic resin as defined in claim 6 wherein the resin is polymethylmethacrylate.

References Cited

UNITED STATES PATENTS

| | | | |
|---|---|---|---|
| 3,092,435 | 6/1963 | Tessandori | 260—41 |
| 3,018,154 | 1/1962 | Downey | 8—39 |
| 2,084,399 | 6/1937 | Kuttel | 260—41 |
| 2,837,437 | 6/1958 | Finlayson | 260—41 |
| 2,470,001 | 5/1949 | Stober | 260—41 |
| 2,109,464 | 3/1938 | Cantrell | 260—41 |

FOREIGN PATENTS

| | | |
|---|---|---|
| 730,692 | 4/1953 | Great Britain. |
| 486,362 | 9/1952 | Canada. |

MORRIS LIEBMAN, *Primary Examiner.*

J. H. DERRINGTON, *Assistant Examiner.*

U.S. Cl. X.R.

106—193; 260—37